United States Patent [19]

Naka et al.

[11] Patent Number: 4,935,659

[45] Date of Patent: Jun. 19, 1990

[54] ULTRASONIC MOTOR

[75] Inventors: Yoji Naka; Yutaka Yoshida, both of Tokyo, Japan

[73] Assignee: Fuji Photo Film Co., Ltd., Japan

[21] Appl. No.: 339,098

[22] Filed: Apr. 14, 1989

[30] Foreign Application Priority Data

Apr. 18, 1988 [JP] Japan .................................. 63-94761

[51] Int. Cl.⁵ .......................................... H01L 41/08
[52] U.S. Cl. .................................... 310/328; 310/323;
354/173.1; 354/234.1; 354/264; 354/265
[58] Field of Search ................ 310/316, 317, 323, 328

[56] References Cited

U.S. PATENT DOCUMENTS 4,645,964  2/1987  Hiramatsu et al. ............. 310/328 X

FOREIGN PATENT DOCUMENTS 0100179  5/1987  Japan .................................. 310/323

Primary Examiner—Mark O. Budd
Attorney, Agent, or Firm—Pasquale A. Razzano

[57] ABSTRACT

An ultrasonic motor has first and second elastically vibrating rotatable means and third rotatable means interposed between the first and second rotatable means. The first and second rotatable means, which are made elastic disk members, generate mechanical vibrations by means of an electrostrictive effect of piezoelectric elements cooperating therewith. Locking means is provided in association with the first to third rotatable means so as to selectively engage with the first to third rotatable means, whereby allowing the rotation of at least one of the first to third rotatable means.

14 Claims, 4 Drawing Sheets

ULTRASONIC MOTOR

BACKGROUND OF THE INVENTION

The present invention relates to an ultrasonic motor, and more particularly to an ultrasonic motor having two rotors and a drive disk interposed between the two rotors.

Disk type ultrasonic motors have s single stator formed with elastic serrations and a single rotor disposed close to the stator. Mechanical vibrations of the serrations of the stator causes a rotational movement of the rotor. The rotation of the rotor is transmitted to a driven member or mechanism through a gear train coupled to an output shaft of the rotor. It is impossible to connect the rotation of the rotor transmitted from the rotor shaft of such an ultrasonic motor to more than one driven members or mechanisms.

OBJECT OF THE PRESENT INVENTION

It is, therefore, a primary object of the present invention to provide an ultrasonic motor which can be used to drive directly more than two driven mechanism without incorporating a special gear trains such as including a planetary gearset.

SUMMARY OF THE INVENTION

The above object can be achieved by an ultrasonic motor having first and second elastically vibrating rotatable means and third rotatable means interposed between the first and second rotatable means. The first and second rotatable means, which are made elastic disk members, generate mechanical vibrations by means of electrostrictive effects of piezoelectric elements cooperating therewith. Locking means is provided in association with the first to third rotatable means so as to selectively engage with the first to third rotatable means, whereby allowing the rotation of at least one of the first to third rotatable means.

The mechanical vibrations of the first and third rotatable means tend to cause a rotation of the third rotatable means. When the third rotatable means is engaged by the locking means, the first and second rotatable means are forced to rotate as a result of reaction of the mechanical vibrations against the third rotatable means. If the mechanical vibrations are caused in opposite directions, the first and second rotatable means rotate in different directions. On the other hand, the first and second rotatable means are engaged with the locking means, the third rotatable is allowed to rotate. Therefore, output from the ultrasonic is obtained from different rotatable means, so that different mechanisms can be operated by the single ultrasonic motor.

BRIEF DESCRIPTION OF THE INVENTION

DETAILED DESCRIPTION OF THE INVENTION

Figure 1:
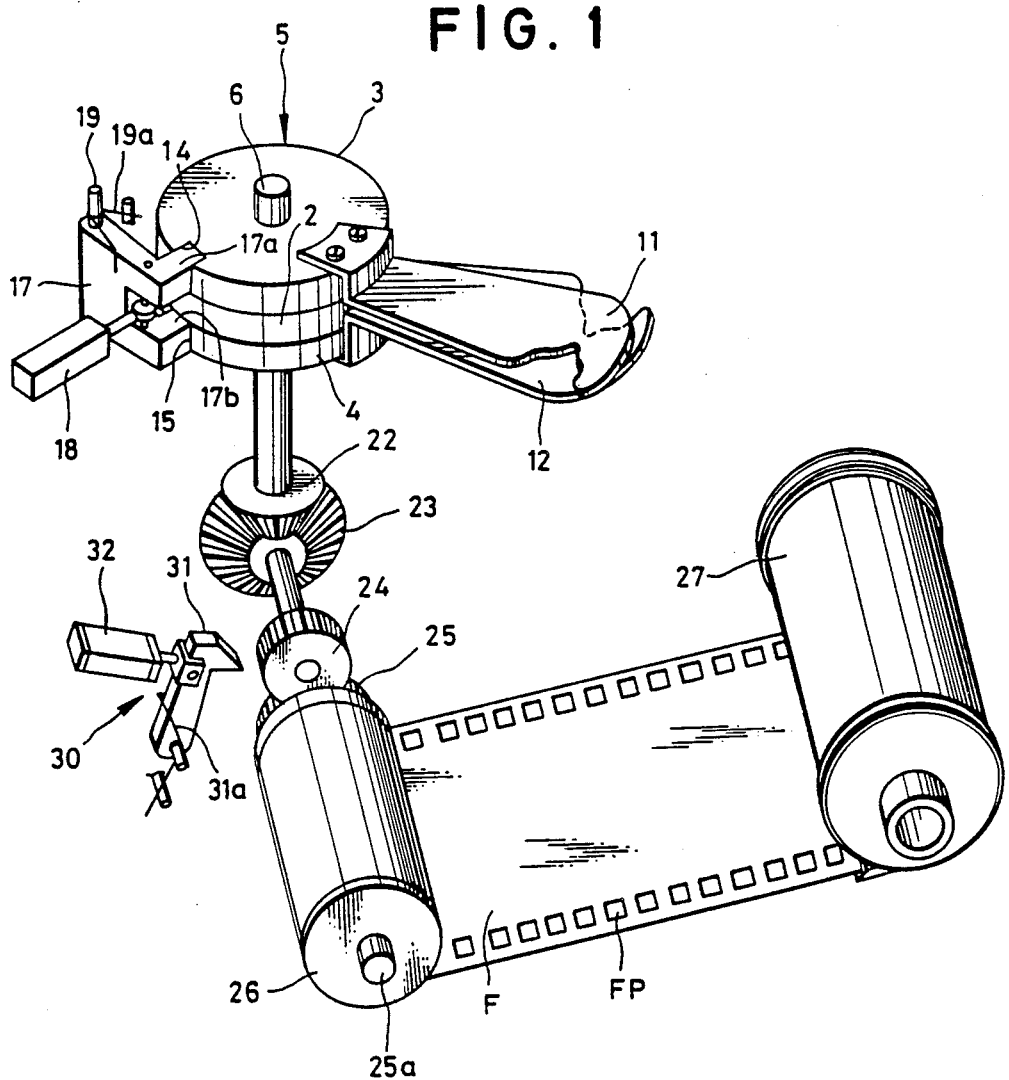
FIG. 1 is a schematic perspective view showing an ultrasonic motor in accordance with a preferred embodiment of the present invention which is cooperated with a camera.
Figure 2:
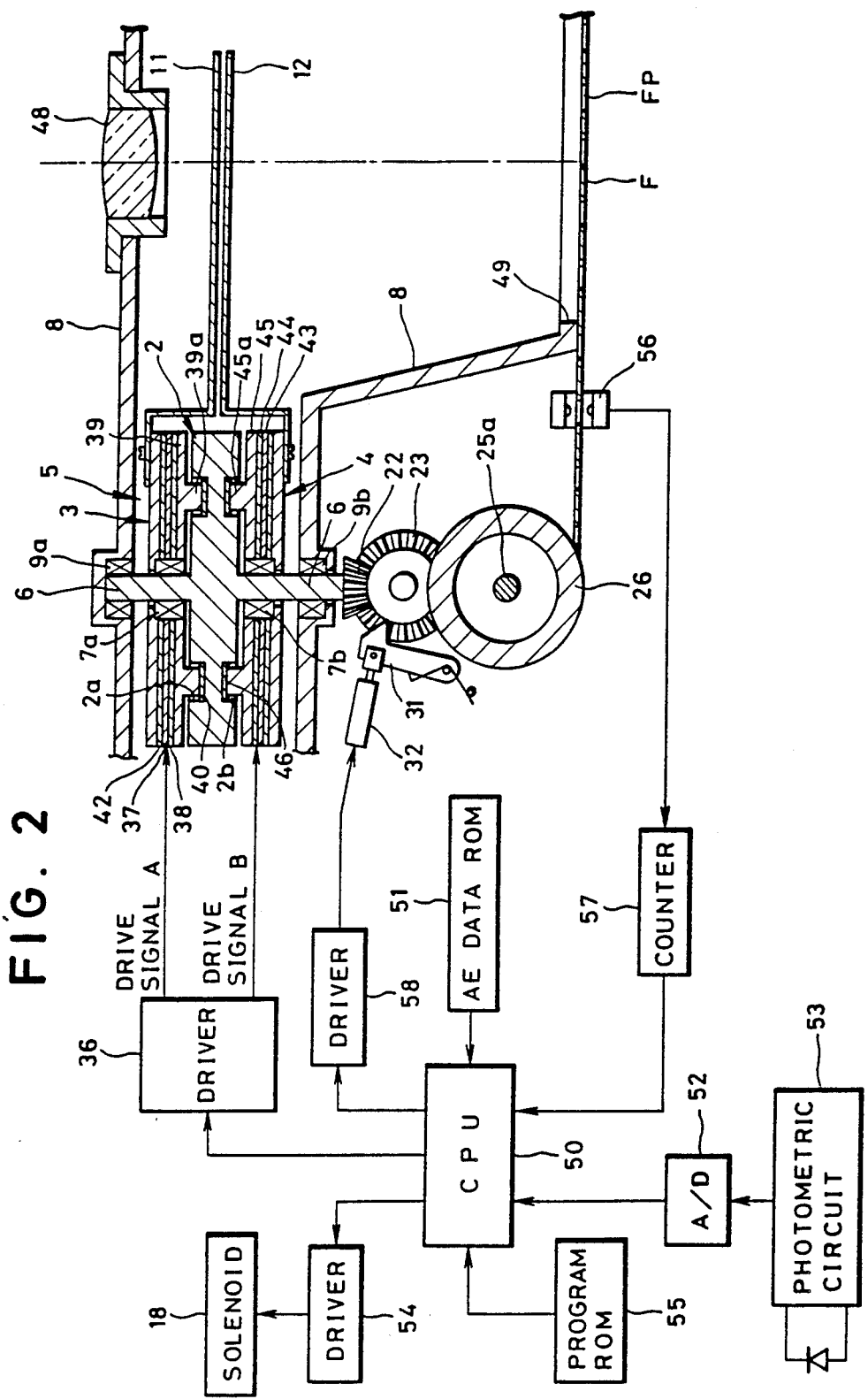
FIG. 2 is a cross sectional view of FIG. 1.

Referring to the drawings, in particularly to FIGS. 1 and 2, an ultrasonic motor 5 in accordance with a preferred embodiment of the present invention which is intended to be used in a camera is shown, comprising upper and lower rotor disks 3 and 4, and a drive disk 2 closely interposed between the upper and lower rotor disks 3 and 4. The drive disk 2 has an integral output shaft 6 rotatably mounting thereon the upper and lower rotor disks 2 and 3 by way of upper and lower bearings 7a and 7b, such as ball bearings, respectively. The output shaft 6 is rotatably supported by way of upper and lower bearings 9a and 9b mounted on frame members 8 of the camera.

The upper and lower rotor disks 2 and 3 have shutter blades 11 and 12 secured thereto, respectively. These shutter blades form a shutter for defining a field stop and an exposure time. The upper and lower rotor disks 2 and 3 are reversely rotatable in opposite directions relative to each other. When the rotor disk 2 rotates in a counterclockwise direction as viewed in FIG. 1, and the rotor disk 3, therefore, in the clockwise direction, the shutter blades 11 and 12 are opened. Accordingly, when the upper and lower rotor disks 3 and 4 rotate in the clockwise and counterclockwise directions, respectively, the shutter blades 11 and 12 are closed.

Each rotor disk 3, or 4 is formed with a peripheral grove 14 or 15, respectively. A lock lever 17 integrally formed with fingers 17a and 17b is rotatably mounted on a shaft 19 secured to the camera body. The lock lever 17 is cooperated with a solenoid 18. Actuating the solenoid 18 causes a snap action of the lock lever 17 against an urging spring 19a, disengaging the fingers 17a and 17b from the peripheral grooves 14 and 15, respectively, whereby the upper and lower rotor disks 3 and 4 are permitted to rotate in the opposite directions.

The lower end of the output shaft 6 penetrating through the lower bearing 9b fixedly supports a bevel gear 22. Rotation of the bevel gear transmitted from the output shaft 6 is connected to a spool gear 25 by way of a gear 24 coupling the bevel gear and the spool gear 25. The spool gear 25 has an integral spool shaft 25a, and the spool shaft 25a is frictionally coupled to a spool drum 26. The drive disk 2 rotates in one direction, the spool drum 26 is rotated in the same direction as the drive disk 2. Therefore, the clockwise rotation of the drive disk 2 causes the clockwise rotation of the spool drum 26 so as to withdraw a film F from a film patrone 27 and wind same around the spool drum 26.

A detent means 30 is provided to cooperate with the gear 24. The detent means 30 consists of a spring urged ratchet 31 which is usually in engagement with a tooth of the gear 24 and a solenoid 32. When the solenoid 32 is actuated, the ratchet 31 is brought into disengagement from a tooth of the gear 24 against a spring 31a so as to permit the counterclockwise rotation of the gear 24.

As is shown in detail in FIG. 2, a piezoelectric means consisting of a pair of piezoelectric ceramic plates 37 and 38 are attached to the lower surface of the upper rotor disk 3 through a felt sheet member 42. An elastic disk member 39 is attached to the lower piezoelectric ceramic plate 38. When a driver 36 applies voltage waves to the piezoelectric ceramic plates 37 and 38, the piezoelectric ceramic plates 37 and 38 oscillate with electrostrictive effects thereof. This causes the elastic disk member 39 to oscillate. The elastic disk member 39 is formed with serrations 39a directed toward the shaft 6 and arranged in a circle having its center at the axis of rotation of the output shaft 6. The serrations 39a are received in an annular groove 2a that has a U-shaped cross-section and its center at the axis of rotation of the output shaft 6. An annular lining member 40, such as an annular ring of felt, is attached to the bottom of the U-shaped groove 2a. The oscillation of the piezoelectric ceramic plates 37 and 38 causes each serration 39a to make elastic deformations in which the top of each serration 39a repeatedly moves in a substantially elliptical path in the groove 2a, whereby the top of each serration 39 frictionally pushes the liner member 4o, so as to move the drive disk 2. The lower rotor disk 4 has a piezoelectric means consisting of a pair of piezoelectric ceramic plates 43 and 44 and an elastic disk 45 integrally formed with serrations 45a arranged in a circle having its center at the axis of rotation of the shaft 6. The serrations 45a are received in a U-shaped groove 2b with a liner felt member 46 formed in the lower surface of the drive disk 2. Because the lower rotor disk 4, which is disposed symmetric with respect to the upper rotor disk 3, is identical in structure and operation to the upper rotor disk 3 and, therefore, need not be described in more detail herein.

The shutter blades 11 and 12 secured to the upper and lower rotor disks 3 and 4, respectively are disposed between a taking lens system 48 mounted on the front frame 8 of the camera body and an exposure frame 49. The shutter blades 11 and 12 are opened and closed according to the rotation of the ultrasonic motor 5 to perform an exposure to a film F laying behind the exposure frame 49.

Controlling the ultrasonic motor 5 is effected by means of a control means comprising driver 36 for the piezoelectric means, a central processing unit (CPU) 50, an automatic exposure (AE) data ROM 51, an A/D converter 52 and a photometric circuit 53. The AE data ROM 51 stores therein data of programmed exposure controls of the shutter blades 11 and 12 selectively used according to conditions of brightness of a subject. The CPU 50 reads out data of a proper programmed exposure control from AE data ROM 51 based on the brightness of the subject provided by the photometric circuit 53 and input through the A/D converter 52 and outputs a shutter control signal representing the data of the proper programmed exposure control to the driver 36. The data of programmed exposure control includes angles through which the upper and lower rotor disks 3 and 4 should be rotated, a time for which the upper and lower rotors 3 and 4 are maintained at the rotated angles, etc.

A ROM 55 and a perforation sensor 56 are connected to the CPU 50. The ROM 55 stores a program of sequence operation of the camera for the CPU 50. The perforation sensor 56 photoelectrically detects perforations FP formed in the film F at regular spacings to outputs pulse signals. A counter 57 counts the pulses and outputs a stop signal to the CPU 50 every time it counts eight pulses. Drivers 54 and 58, that, respectively, actuate the solenoids 18 and 32, are connected to the CPU 50.

Figure 3:
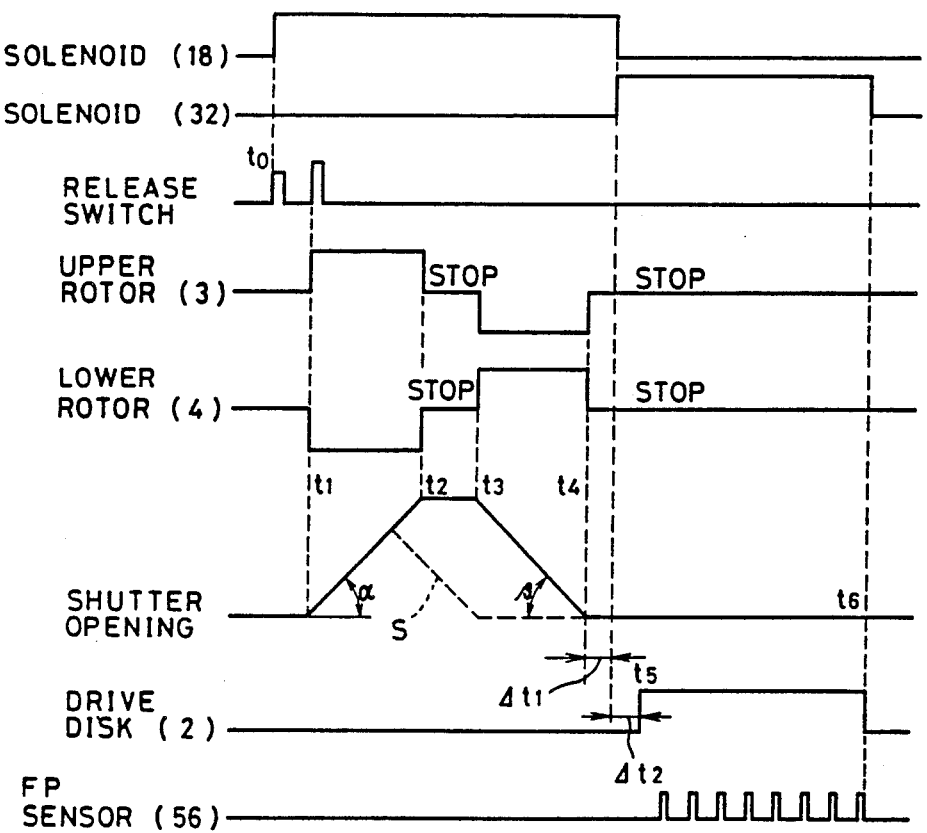
FIG. 3 is a timing chart illustrating an operation of the camera incorporating the ultrasonic motor of FIG. 1.

The operation of the ultra sonic motor 5 constructed as above will be best understood by reference to the timing chart shown in FIG. 3. When the film F is loaded in the camera and the first frame of the film F is placed at the exposure frame 49, the ratchet 31 engages with the gear 24 so as to prevent same to rotate in any direction. Upon a depression of a shutter release button (not shown) in its half way at a time to, a release signal is provided. At the presence of a release signal, the CPU 50 actuates the driver 54 to energize the solenoid 18, turning the lock lever 17 in the clockwise direction, so as to bring the fingers 17a and 17b out of engagement with the peripheral grooves 14 and 15. At this time, the solenoid 32 is kept inactive, so that the ratchet 31 is kept in engagement with a teeth of the gear 24 by means of spring force of the spring 31a, preventing it from rotating in the counterclockwise direction.

Responding to the depression of the shutter release button in its half way at a time $T_o$, the photometric circuit 53 is activated to measure the brightness of a subject. An electric output representing the subject brightness from the photometric circuit 53 is transformed in a digital form by means of the A/D converter 52 and then transmitted to the CPU 50. The brightness signal causes the CPU 50 to read out data of a programmed exposure control most suitable for the brightness of the subject from the AE data ROM 51. Upon a depression of the shutter release button in its full stroke at a time $t_1$, a drive signal is applied to the driver 36 and causes it to provide drive control signals A and B for the piezoelectric assemblies of the upper and lower rotor disks 3 and 4, respectively. Each drive control signal A, B consists of oscillating voltages which have an same frequency and an same amplitude but are different in phase by 90 degrees from each other. The vibrations of the serrations 39a and 45a of the elastic disks 39 and 45 that are opposite and determines the direction of rotation of the upper and lower rotor disks 3 and 4 depends on the advancement or retardation in phase of the oscillating voltages.

When the shutter blades 11 and 12 should be controlled to open and close to perform a trapezoidal opening program, the driver 36 applies drive control signals A and B to the piezoelectric lies of the upper and lower rotor disks 3 and 4 to cause the upper and lower elastic disk members 39 and 45 to produce vibrations, respectively, that tend to move the drive disk 2 in the opposite directions during a time period defined between times $t_1$ and $t_2$. However, because the ratchet 31 still prevents the gear 24, and hence the shaft 6 integral with the drive disk 2, from rotating, the upper and lower rotor disks 3 and 4 are rotated in the opposite directions with the reactions of the upper and lower elastic disk members 29 and 45 against the drive disk 2. This causes the shutter blades 11 and 12 to move away from each other so as to open gradually. At the time $t_2$ that the shutter blades 11 and 12 define a maximum opening or aperture for the subject brightness, the driver 36 removes the drive control signals A and B, stopping the ultrasonic motor 5 to keep the shutter blades 11 and 12 open at the maximum aperture until a time $t_3$ is reached.

At the time $t_3$, the driver 36 provides again the drive control signals A and B reversed in phase so as to the upper and lower elastic disk members 39 and 45 to produce vibrations, respectively, that tend to move the drive disk 2 in the opposite directions during a time period defined between times $t_3$ and $t_4$, whereby the upper and lower rotor disks 3 and 4 are rotated in the opposite direction with respect to the directions in which they are rotated for the times $t_1$ and $t_2$. This causes the shutter blades 11 and 12 to gradually close and fully close at the time $t_4$. In such a way, an exposure equivalent to an area defined by a trapezoid $t_1 t_2 t_3 t_4$ is given to the film F. Of course, if the time period between the times $t_2$ and $t_3$ is zero (0), an exposure made by the shutter blades 11 and 12 is given as a triangle S shown by a chained line in FIG. 3. The speed of rotation of the ultrasonic motor 5 can be changed according to levels of oscillating voltages applied thereto. This makes it possible to vary the rate of opening and closing of the shutter blades 11 and 12, namely inclinations $\alpha$ and $\beta$ of a side of the trapezoid defined between times $t_1$–$t_2$ and a side of the trapezoid defined between times $t_3$–$t_4$, respectively.

After the full closing of the shutter blades 11 and 12, the ultrasonic motor 5 slightly overturns for a short time period $\Delta t_1$. Before the passage of the short time period $\Delta t_1$, the CPU 50, on one hand, deactuates the driver 54 so as to deenergize the solenoid 18 and, on the other hand, actuates the driver 58 so as to energize the solenoid 32. As a result, the lock lever 17 is forced to turn by the spring 19a so as to bring the fingers 17a and 17b into engagement with the peripheral grooves 14 and 15 of the upper and lower rotor disks 3 and 4, whereby positioning the upper and lower rotor disks 3 and 4 at their initial positions. The ratchet 31 is disengaged from the gear 24, whereby permitting drive disk 2.

At a time $t_5$ a short time period $\Delta t_2$ has lapsed after the time period $\Delta t_1$, the CPU 50 reads out the data of camera operation from the ROM 55 and outputs a signal to the driver 36 so as to provide the piezoelectric assemblies with the drive control signals A and B. This causes the upper and lower elastic disk members 39 and 45 to oscillate so as to cause the rotation of the upper and lower rotor disks 3 and 4. Because of the engagement of the fingers 17a and 17b of the lock lever 17 with the peripheral grooves 14 and 15 of the the upper and lower rotor disks 3 and 4, the rotor disks 3 and 4 are prevented from rotating. Therefore, the drive disk 2 is rotated in the counterclockwise direction as viewed in FIG. 1.

The counterclockwise rotation of the drive disk 2 is transmitted to the spool drum 26 through a gear train of the bevel gears 22 and 23, the gear 24 and the spool gear 25, so that the spool drum 26 winds the film F therearound. With the movement of the film F, the perforation sensor 56 detects the perforations FP of the film F and provides one pulse per each perforation FP. When the counter 57 counts eight pulses included in a single picture frame at a time $t_6$, it outputs a stop signal to the CPU 50, thereby stopping the drivers 36 and 58. Accordingly, the drive disk 2 stops to terminates the forward movement of the film F and the solenoid is deenergized to bring the ratchet 31 of the detent means 30 into engagement with the gear 24 and lock it. As a result, all of the movable elements rest in their initial situations.

Figure 4:
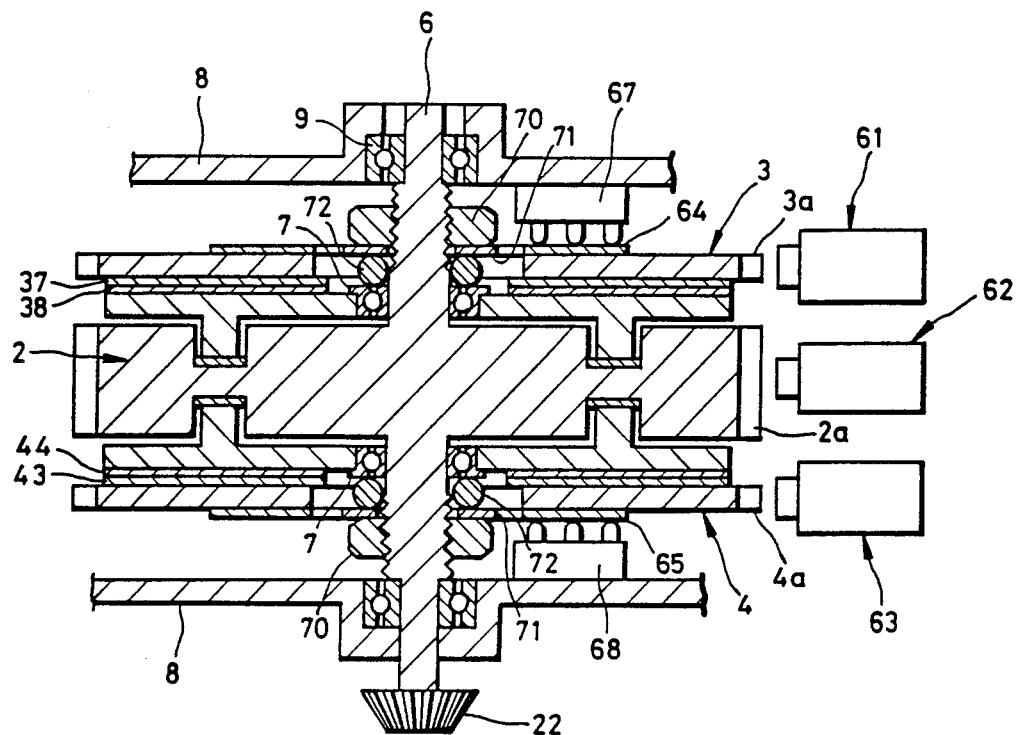
FIG. 4 is a cross sectional view showing an ultrasonic motor in accordance with another preferred embodiment of the present invention.

Referring to FIG. 4 showing a variant of the ultrasonic motor in which the same parts or elements are denoted by the same reference numerals for the previous embodiment, the drive disk 2 and the rotors 3 and 4 are either provided with peripheral teeth or attached with annular gears 2a, 3a and 4a, respectively. Lock means 61, 62 and 63 are provided adjacent to the annular gears 2a, 3a and 4a, respectively, and independently caused to engage and disengage the corresponding one. In this embodiment, the gear 24 or the spool gear 25 may be directly connected to the annular gear 2a. This can avoid the provision of the bevel gear 22. Each rotor 3, 4 is formed with a patterned electric conductive section 64, 65 on one surface and slidably contacted with a brush 67, 68, respectively. Through the slidable contact between the conductive section 64, 5 and the brush 67, 68, oscillating voltage is applied to the piezoelectric plates 37 and 38, 43, 44 of the rotor 3, 4, respectively. Denoted by numerals 70, 71 and 72 are a lock nut, a washer and an O-ring, respectively, which are provided for interposing the drive disk 2 between the rotors 3 and 4 with a proper holding force.

As apparent from the above, the shutter blades 11 and 12 are directly driven by the double rotor ultrasonic motor 5 having a sufficient starting torque, whereby any delay of opening and closing of the shutter blades 11 and 12 due to the force of inertia is not caused, so that an exposure with a high accuracy is always made. Furthermore, because the drive disk 2 of the double rotor ultrasonic motor 5 can be driven with a rotational force twice that of a conventional single rotor ultrasonic motor, the ultrasonic motor 5 contributes to a reliable operation of the film advancing mechanism when a large load is exerted on.

While the ratchet 31 locks the gear 24, and hence drive disk 2, the two rotors 3 and 4 can be independently rotated in a same direction and in opposite directions by controlling the oscillating voltages applied to the piezoelectric plates.

The ultrasonic motor 5 can be cooperated with any mechanism that should be driven before or after the shutter blades 11 and 12, such as lens drive mechanisms for a zooming lens, an automatic focusing device, and the like. It may be permissible to provide either one of the fingers 17a and 17b of the lock lever 17, or either one of the lock means 61 and 63, so as to lock either one of the rotors 3 and 4 only. This enables the ultrasonic motor 5 to operate like as single rotor conventional ultrasonic motors.

What is claimed is:

1. An ultrasonic motor comprising:
   first rotatable means which is elastic and generates mechanical vibrations caused by means of an electrostrictive effect of a first piezoelectric element cooperating therewith;
   second rotatable means which is elastic and generates mechanical vibrations by means of an electrostrictive effect of a second piezoelectric element cooperating therewith;
   third rotatable means interposed between the first and second rotatable means so as to rotate as a result of the mechanical vibrations of the first and second rotatable means; and
   locking means selectively engageable with the first to third rotatable means to permit a rotation of at least one of the first to third rotatable means.

2. An ultrasonic motor as defined in claim 1, wherein said first and second rotatable means rotate in opposite direction.

3. An ultrasonic motor as defined in claim 1, wherein each said rotatable elastic means functions as a stator of the ultrasonic motor.

4. An ultrasonic motor as defined in claim 1, wherein the third rotatable means functions as a stator of the ultrasonic motor.

5. An ultrasonic motor as defined in claim 1, wherein the locking means comprises a first solenoid operated lock lever integrally formed with first and second fingers engageable with the first and second rotatable elastic means and a second solenoid operated locking lever engageable with the rotatable means independently from the first solenoid operated locking lever.

6. An ultrasonic motor as defined in claim 5, wherein the third rotatable means has an integral shaft with which the second solenoid operated lock lever is engageable.

7. An ultrasonic motor as defined in claim 6, wherein the shaft has a gear member secured thereto and said second solenoid operated locking lever is a ratchet engageable with the gear.

8. An ultrasonic motor as defined in claim 1, wherein the locking means comprises first to third electric operated locking members for the first to third rotatable means, each electric operated locking member being operated independently from the other two.

9. An ultrasonic motor as defined in claim 8, wherein the first to third rotatable means are provided with peripheral teeth with which the first to third electric operated locking members are engageable.

10. An apparatus used in a camera comprising:
an ultrasonic motor having first rotatable means which is elastic and generates mechanical vibrations by means of an electrostrictive effect of a first piezoelectric element cooperating therewith;
second rotatable means which is elastic and generates mechanical vibrations by means of an electrostrictive effect of a second piezoelectric element cooperating therewith;
third rotatable means interposed between said first and second rotatable means so as to rotate as a result of the mechanical vibrations of said first and second rotatable means;
locking means selectively engageable with said first to third rotatable means to permit a rotation of at least one of said first to third rotatable means; and
at least a first and second camera element driven by said first to third rotatable means, the first camera element being driven by the output of said first and second rotatable means when said locking means engages with said third rotatable means, while the second camera element is driven by the output of said third rotatable means when said locking means engages with said first and second rotatable means.

11. An apparatus as defined in additional claim 10, wherein said first camera element is a shutter means which is also used as an aperture stop.

12. An apparatus as defined in additional claim 10, wherein said second camera element is a film advancing mechanism.

13. An apparatus as defined in additional claim 10, wherein said shutter means is a pair of shutter blades which are directly mounted to said first and second rotatable means, respectively, and driven to move close to and apart from each other.

14. An apparatus used in a camera comprising:
first and second rotatable means having piezoelectric elements and elastic members generating mechanical vibrations in cooperation with said piezoelectric elements;
third rotatable means disposed between said first and second rotatable means, said third rotatable means receiving said mechanical vibrations from said elastic members and supporting said first and second rotatable means rotatable thereon;
locking means for locking the rotation of said third rotatable means; and
a pair of shutter blades respectively fixed to said first and second rotatable means, wherein said first and second rotatable means are driven by said mechanical vibrations from said elastic members to rotate in opposite directions, opening and closing said shutter blades.

* * * * *